United States Patent
Fu et al.

(10) Patent No.: US 6,650,947 B2
(45) Date of Patent: Nov. 18, 2003

(54) MULTI-VARIABLE CONTROL LOOP ASSESSMENT

(75) Inventors: Ye Fu, Vaughan (CA); Seyhan Nuyan, Thornhill (CA)

(73) Assignee: Metso Automation Oy, Helsinki (FI)

( * ) Notice: Subject to any disclaimer, the term of this patent is extended or adjusted under 35 U.S.C. 154(b) by 385 days.

(21) Appl. No.: 09/816,957

(22) Filed: Mar. 23, 2001

(65) Prior Publication Data

US 2002/0177909 A1 Nov. 28, 2002

(51) Int. Cl.$^7$ .............................................. G05B 13/02
(52) U.S. Cl. .............................. 700/38; 700/32; 700/44; 700/45; 700/47; 700/51; 700/29
(58) Field of Search ............................ 700/28–56, 30, 700/32, 34, 52, 53, 128; 318/561; 703/2

(56) References Cited

U.S. PATENT DOCUMENTS

| | | | |
|---|---|---|---|
| 5,442,562 A | * 8/1995 | Hopkins et al. | 700/108 |
| 5,489,829 A | * 2/1996 | Umida | 318/561 |
| 5,568,377 A | * 10/1996 | Seem et al. | 700/37 |
| 5,877,954 A | * 3/1999 | Klimasauskas et al. | 700/29 |
| 6,110,214 A | * 8/2000 | Klimasauskas | 703/2 |

OTHER PUBLICATIONS

Harris, Thomas J, "Assessment of Control Loop Performance" The Canadian Journal of Chemical Engineering, vol. 67, Oct., 1989.

Jofriet, et al. "An Expert System for Control Loop Performance Analysis," 81$^{st}$ Annual Meeting, Technical Section, CPPA, Feb. 2–3, 1995.

Perrier, et al., "Towards Mill–Wide Evaluation of Control Loop Performance," Control Systems '92, Dream vs. Reality: Modern Process Control in the Pulp and Paper Industry, Sep. 29–Oct. 1, 1992, Whistler, B.C.

* cited by examiner

Primary Examiner—John Follansbee
Assistant Examiner—Crystal J. Barnes
(74) Attorney, Agent, or Firm—Fulwider Patton Lee & Utecht, LLP

(57) ABSTRACT

A multivariable analysis tool is provided wherein an orthogonal decomposition method such as a Partial Least Squares algorithm is applied to a disturbance model, which relates the known loop disturbances to the loop model residue. The tool according to the invention first extracts the most dominant correlation to the loop model residue and then uses the residue to search for secondary dominant correlation in an orthogonal space, and repeats this process until no further output variation can be significantly attributed by the next dominant correlation. In this way, the analysis tool of the present invention is able to estimate the performance potential of each control loop under different disturbance conditions and provide a control performance index by comparing the achieved performance to the performance potential in a multi-variable environment. This index indicates whether or not a given loop is under optimal operation and shows variance of the loop from the best achievable loop performance.

13 Claims, 17 Drawing Sheets

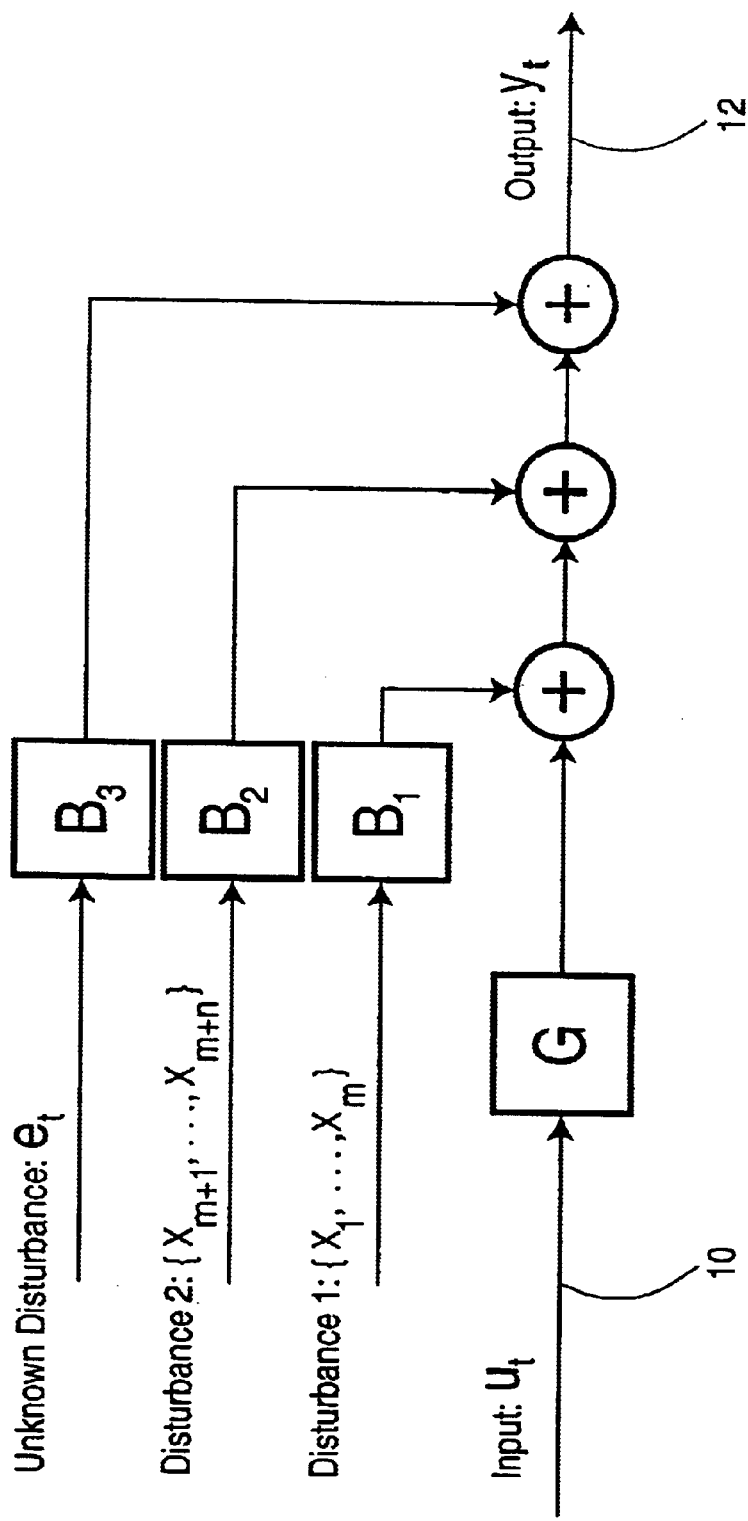

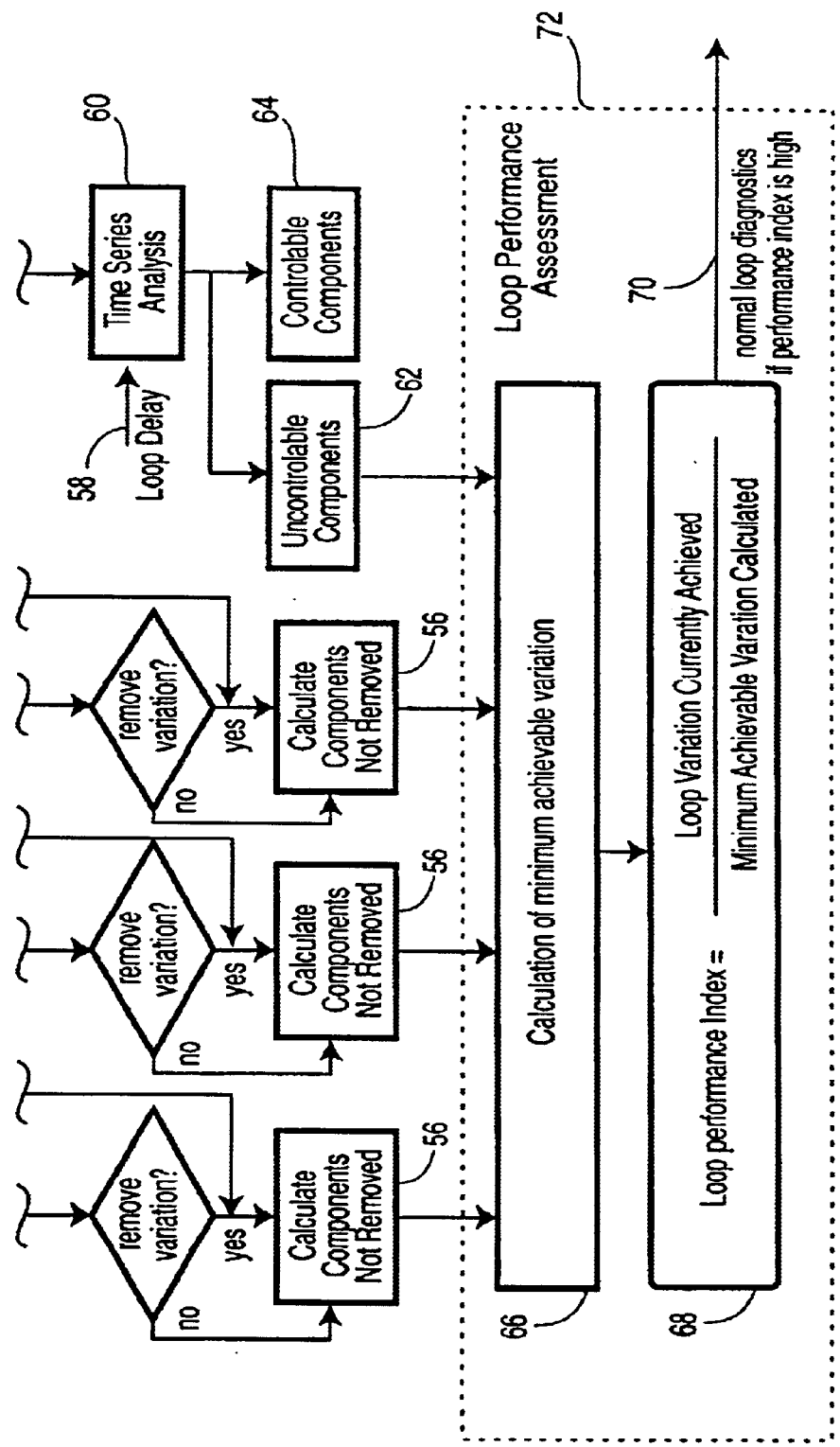
Figure 2a"

Disturbance model residual e ( three latent variables, ———)
and trend with minimum achievable variance (o = 1.55, ———)

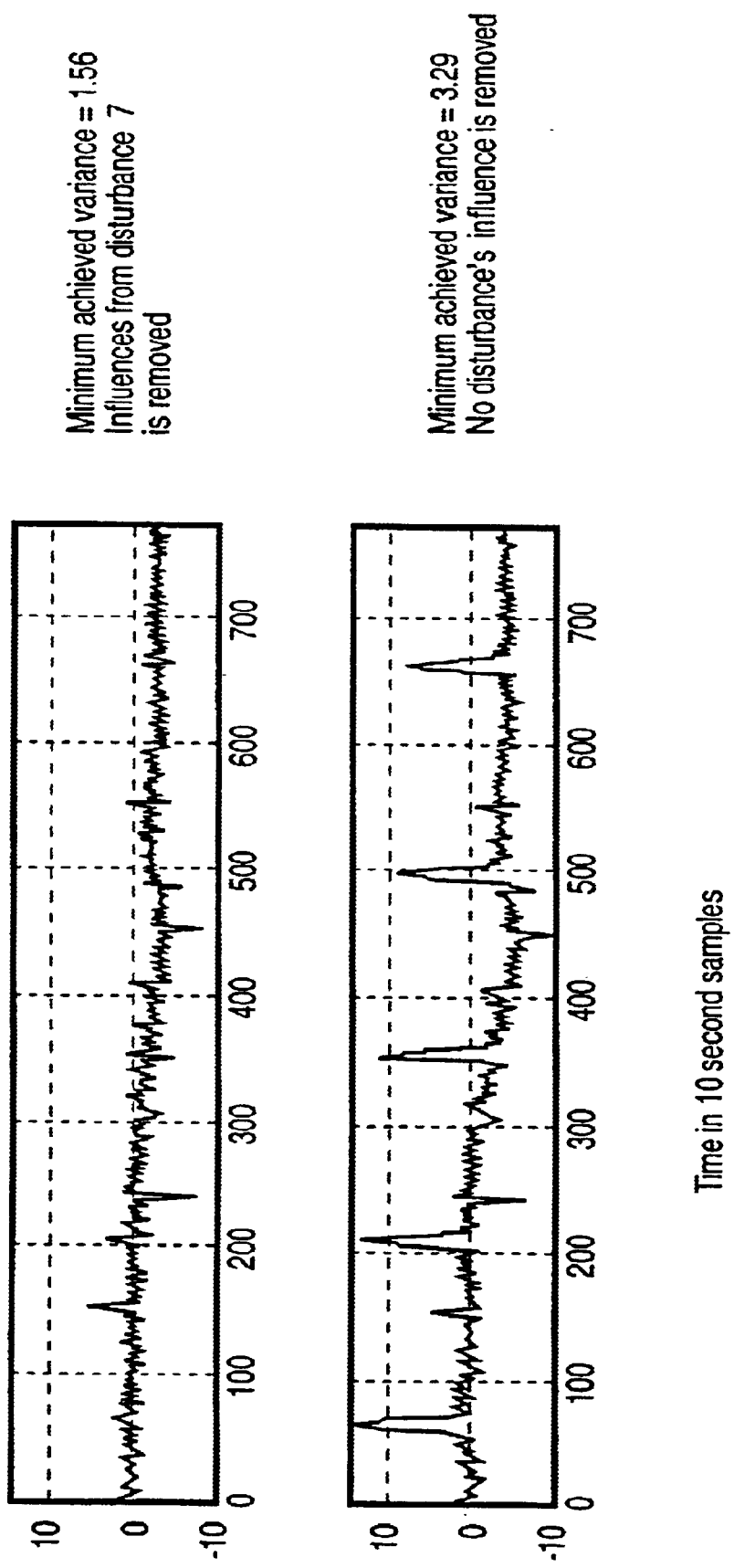

MULTI-VARIABLE CONTROL LOOP ASSESSMENT

FIELD OF THE INVENTION

This invention relates, in general to control systems, and more particularly to a multi-variable control loop assessment method and apparatus for analyzing, assessing and trouble shooting control loops in complex industrial processes such as papermaking operations.

BACKGROUND OF THE INVENTION

In a large industrial process environment, such as a paper mill, there are hundreds or even thousands of process control loops operating within highly automated pieces of equipment. Many of these loops interact with each other and influence each other's performance. Paper quality and production efficiencies depend on the performance of these loops and suffer severely if the control loops are not optimized.

It is known in the prior art to compile a list of relevant variables of interest and then plot and trend the variables for visual examination in order to trouble-shoot process and/or control problems and to identify sources of variations. Knowledgeable engineers may then examine the cross-correlation between pairs of variables, auto-correlation, power spectrum or similar classical time series analysis functions on the variables. However, the selection of trends for observation is based on the engineer's process knowledge, which is a manual, very time-consuming and subjective process. Another drawback of using cross-correlation is that normally only the most dominant component is visually observable. Often the most dominant influence of a loop is its control signal. Interactions from other variables may have weaker influences on the loop, thus making such interactions difficult to determine using such prior art cross-correlation methods.

Automatic process and control diagnostic tools have been developed for assessing and troubleshooting large numbers of control loops and thereby overcoming some of the disadvantages inherent in prior art manual observation and cross-correlation methodologies. Such tools incorporate automatic data logging and data mining functions for collecting and storing measurements from control loops and other key process measurements. The estimation of control loop capability is normally based on a single-variable approach by examining the loop output frequency content. The variability improvement capacity is then related to the observation of the low frequency content in the power spectrum of the control loop output. There exists in the prior art no suitable measure on the minimum achievable loop output variation, and no method to predict the influence of interactive loops.

Professor Thomas Harris of Queen's University, Canada, published an article on control loop assessment in *The Canadian Journal of Chemical Engineering*, Vol. 67, October 1989, in which he proposed a method of calculating an index for a single-variable loop. This index is now known as the Harris index. Industrial applications of the Harris index began appearing in 1992, as reported in such articles as "Towards mill-wide evaluation of control loop performance" by M. Perrier and A. Roche in *Control Systems '92* conference, and "An expert system for control loop analysis" by P. Jofriet, et. al. in *CPPA annual meeting*, 1995. Successful applications in paper mills are limited to lowest level loops due to the fact that the method is based on the single-variable approach.

It has been recognized in the prior art that control loop performance assessment based on a single variable approach provides an erroneous loop performance index due to cyclical perturbations. Because of the interactions between multiple control loops, only a correctly implemented multivariable analysis is capable of revealing the true process and control information, and is thereby suitable for assessment and troubleshooting purposes.

However, the direct extension of Harris's method to a multivariable process gives rise to practical difficulties that require extensive process modeling. An alternative approach to determining signal correlation involves dividing potentially malfunctioning loops with approximately coincident spectral peaks into possible interacting classes. Loop interaction is accounted for by the calculation of a "modified" index, as set forth in U.S. Pat. No. 5,838,561, entitled "Automatic Control Loop Monitoring and Diagnostics" by James Owen. However, the approach advocated by Owen is only valid when interacting loops have common primary or secondary frequencies. This normally requires that the loop is clearly oscillating. Also, only the most dominant component may be determined with this technique such that weaker correlation is ignored.

SUMMARY OF THE INVENTION

According to the present invention, a multivariable analysis tool is provided wherein an orthogonal decomposition method such as the Partial Least Squares algorithm is applied to a disturbance model relating the known loop disturbances to the loop model residue. The tool according to the invention first extracts the most dominant correlation to the loop model residue and then uses the residue to search for secondary dominant correlation in an orthogonal space. This process is repeated until no further output variation can be significantly attributed by the next dominant correlation.

In this way, the analysis tool of the present invention is able to estimate the performance potential of each control loop under different disturbance conditions and provide a control performance index by comparing the achieved performance to the performance potential in a multi-variable environment. This index indicates whether or not a given loop is under optimal operation and, in fact, shows the variance of the loop from the best achievable loop performance.

The analysis tool also predicts potential control improvement when any control solution is used to reduce a known disturbance variation (for example, feed-forward control or advanced controls such as multi-variable control using MPC techniques, etc.). This prediction can then be used to decide and justify the use of specific control solutions.

Importantly, the analysis tool of the present invention identifies sources of process variations through the disturbance model parameters associated with the contribution of each known disturbance signal to the loop model residue through latent variables. This information is then used to troubleshoot the process, measurement and/or control functions or malfunctions in a multi-variable process environment.

In the disturbance model, known disturbance signals with little contribution towards the loop model residue could be dropped out. Those disturbances are identified by the insignificance of their coefficients associated with the disturbance model output. Further, looking for signals greatly correlated with the disturbance model residue and adding them in the disturbance model as known disturbances will expand a user's knowledge of process. Such added loop disturbances may have great influence on the loop performance and once their variations are eliminated, a significant reduction on the minimum achievable loop variation could be realized.

Using the novel ideas of this invention and the control loop assessment functions, the analysis tool of the present invention has clear and useful application for process engineers, project engineers, service engineers, troubleshooting personnel and sales engineers in paper making mills. Moreover, this invention applies more generally to loop monitoring and process insight/troubleshooting products that may be useful or desirable in other process industries.

BRIEF DESCRIPTION OF THE DRAWINGS

A detailed description of the preferred embodiment is set forth herein below, with reference to the following drawings, in which:

FIG. 1 is a block diagram of a multi-variable loop to which the present invention may be applied;

DETAILED DESCRIPTION OF THE PREFERRED EMBODIMENT

The analysis tool of the present invention is designed for application to a multivariable control loop, a conventional model of which is shown in FIG. 1. The loop consists of an input 10 (u) applied to a process model (G), an output 12 (y) and multiple disturbances. The control block that generates loop input 10 (u) is not shown in this structure. Disturbance variables can be classified as known disturbances (x), and unknown disturbance (e). Known disturbances are measurable. In a multivariable setting, some of the measurable disturbances may be used in control.

Figure 2A:
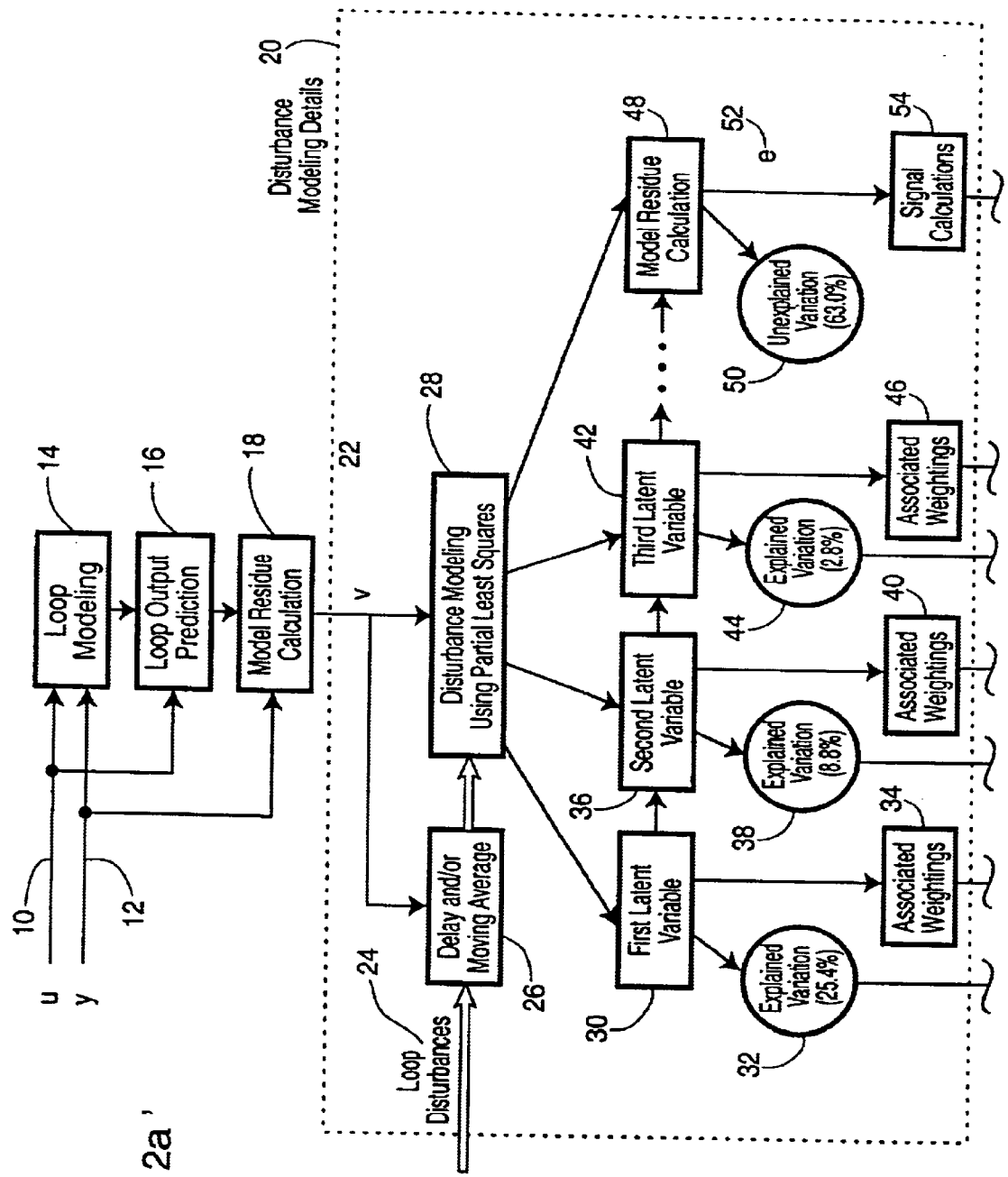
FIG. 2a is a flowchart showing operation of the multi-variable control loop analysis tool of the present invention.
Figure 3:
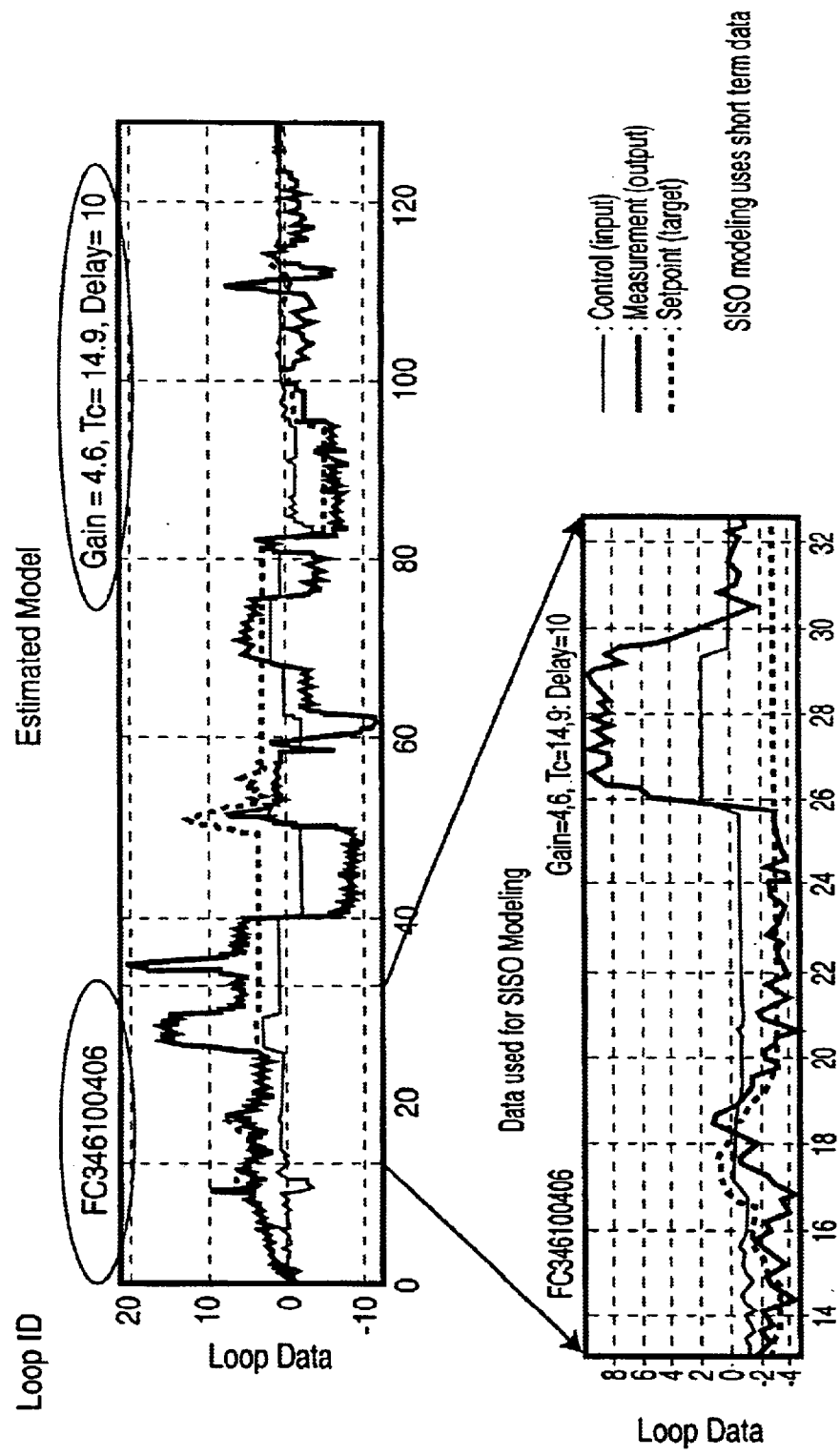
FIG. 3 is a graph showing exemplary control input and measurement output data used to generate a first order dynamic SISO (Single Input Single Output) loop model, using the analysis tool of the present invention.
Figure 4:
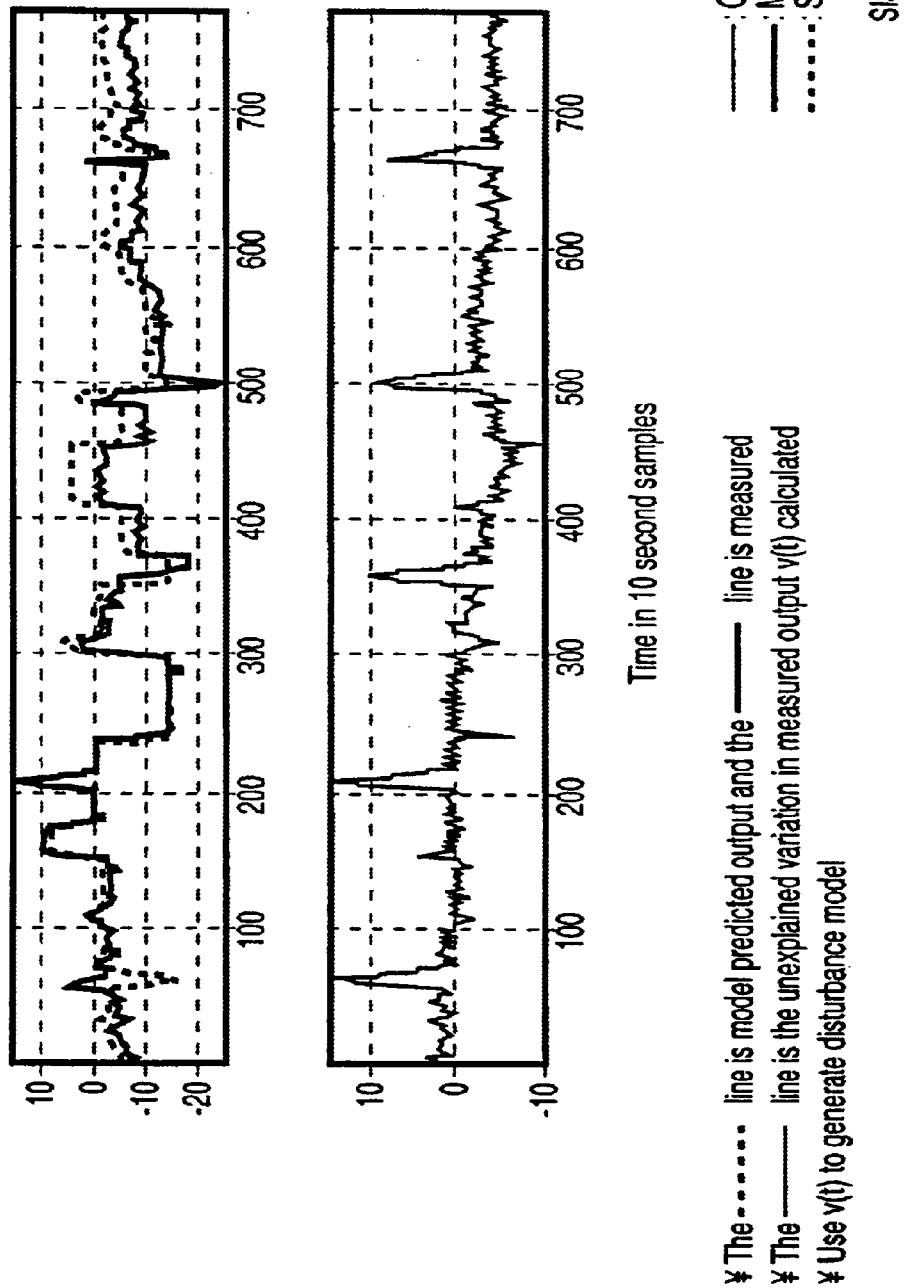
FIG. 4 is a graph showing the calculation of the loop model residue as the difference between the loop measured output and the loop model predicted output, using the analysis tool of the present invention.

If the process model (G) is unknown, the input 10 and output 12 are used in dynamic processing loop modeling 14 to estimate the process or loop delay, gain and time constant, as shown in FIG. 2a. In other cases, the process model (G) may be known from the initial control commissioning. In this case the modeling step in block 14 is not required. The loop modeling 14 is performed using bump test data, or data with sufficient excitation that the loop output y is mainly influenced by its control action u. An example of using sufficiently excited signals in loop modeling is shown in FIG. 3. The shaded area has a few bump tests and the corresponding data is used to generate a first order dynamic model of the loop delay, process gain and time constant by using standard parameter estimation methods. Loop output prediction is performed in block 16 using the model (G) and the loop input 10. Model residue or error v, 22, is then calculated in block 18 as the difference between the loop measured output and the loop predicted output using the model (G), as shown in FIG. 4. The model residue is mainly influenced by disturbances, as discussed in greater detail below.

Visual observation of the model residue v indicates that there are five spikes roughly 150 samples apart (1500 seconds or 25 minutes). Also, there is a slowly drifting trend starting from the 300th sample. While these trends are more noticeable in this example, generally, without residual calculation, they are not at all obvious.

The processes of blocks 14, 16 and 18 are known in the art. However, the use of loop model residue and an orthogonal decomposition method such as a PLS algorithm to generate the disturbance model is encompassed by the present invention, as identified generally by block 20.

Loop disturbances 24 are selected based on the user's process knowledge and measurement availability. The disturbance variables for the present example are plotted in FIG. 5 and the process diagram along with the explanations of the disturbance variables is shown in FIG. 6. The PLS orthogonal decomposition algorithm is used in 28, where the disturbance model inputs are, in the general case, the delayed and/or moving average loop disturbance signals 24. The amount of delays and the moving averages are determined in block 26 by a traditional cross-correlation method between each disturbance signal and loop model residue v. The PLS block 28 generates a disturbance model represented by orthogonal latent variables and the model residue error (e), 52, which is generated by a Model Residue Calculation block, 48, discussed in greater detail below. More particularly, the PLS orthogonal decomposition algorithm 28 operates in a manner similar to an Eigenvalue decomposition method to determine the orthogonal components, which account for the largest variations in the output and the contributions of the loop's known disturbances to each latent variable. In this way, much of the variation in the output can be explained with the proper combination of the inputs (i.e. the measured disturbance signals).

Figure 7:
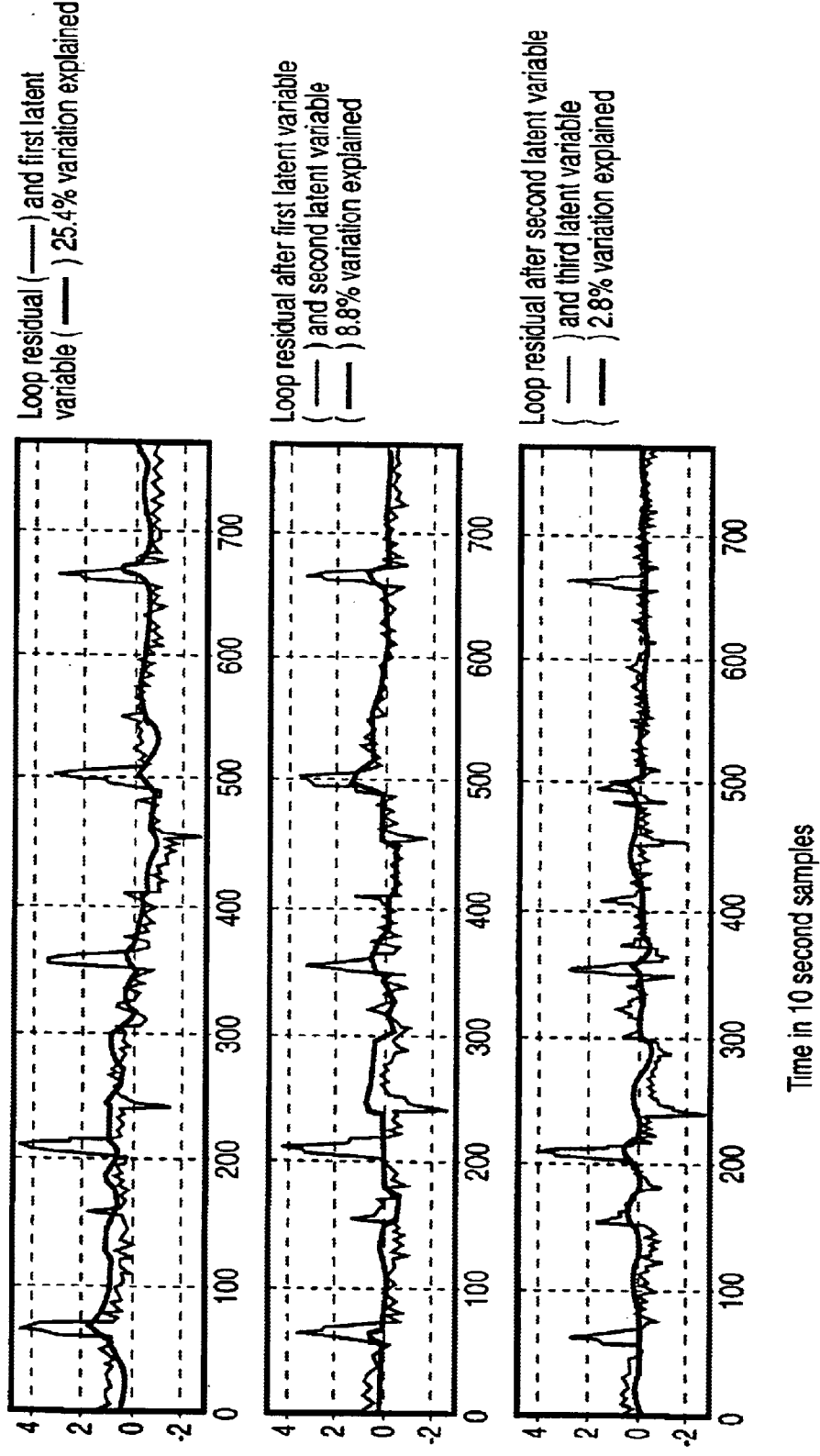
FIG. 7 is a series of graphs showing first, second and third orthogonal latent variables in the disturbance model relating the known loop disturbances to the loop model residual error, according to the present invention using the PLS algorithm.

The results of using three latent variables are shown in FIG. 7, for the present example. Each latent variable explains some variation in the disturbance model output (v) and has associated weightings to link the model inputs. According to the PLS orthogonal decomposition algorithm, the first latent variable 30 explains the biggest variation (in the present example, 25.4%) of v, 22, contributed by disturbances listed in 24, as identified at 32. Associated weight from each disturbance to the first latent variable is also calculated at 34. Similarly, second and third latent variables are calculated which explain 8.8% and 2.8% of the total variation in the disturbance model output v, respectively, in blocks 36 and 42, as identified at 38 and 44. Associated weight from each disturbance to the second and third latent variables are also calculated at 40 and 46, respectively. There is no significant variation that can be further extracted by using more latent variables. In this case, the total output variances that can be explained total 37.0%. A large amount of output variation (the remaining 63%), 50, is still unexplained in the disturbance model residue (e), 52, which is calculated in 48 by subtracting the orthogonal variables from the loop residue (v), 22.

Block 54 is provided to account for possible loop setpoint changes. When there is no requirement for a setpoint change, block 54 is not needed. Specifically, signal calculation block 54 operates on the disturbance model residue (e) 52 to perform the following function:

$$e+(Gu-Y_{sp})$$

where Gu is the predicted output due to control action and $Y_{sp}$ is the setpoint. However, since Gu is always controllable, it may not be required to be in the formula. This reflects the fact that some changes in the setpoint may not be realised. The unrealized portion of the setpoint changes are thus added to the disturbance model residue e in block 54 prior to the time series analysis calculation in block 60.

As indicated above, one important property of the PLS orthogonal decomposition algorithm is that the latent variables 30, 36, 42 and the disturbance model residue e, 52, are orthogonal so that their influences to the loop can be added.

Figure 8:
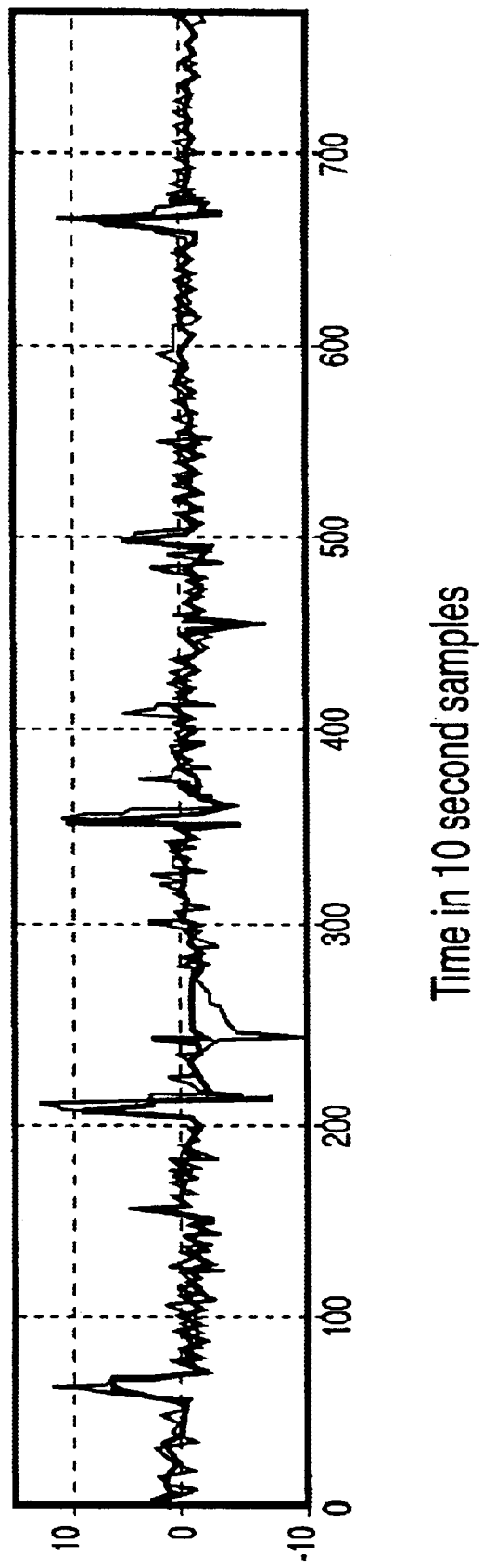
FIG. 8 is a graph showing the disturbance model residue after removing the influence of first, second and third latent variables in the disturbance model of FIG. 7.

For the given example, the disturbance model residue e, 52, (after taking away the influence from the first three latent variables) and the model residue under best control are shown in FIG. 8. The minimum achievable output variance excluding the influence from three latent variables is 1.55 (standard deviation).

The standard deviation of signals in the disturbance model is as described in Table 1 below:

Also, for the given example, influences of latent variables to the minimum achievable loop output variation are quantified. With the coefficients relating each known disturbance to the latent variable, the influence of each individual disturbance to the minimum achievable loop output variation can be calculated, as will be explained in greater detail. The minimum variance 1.55 is achieved in the event that the influence of all three latent variables is eliminated.

Figure 5:
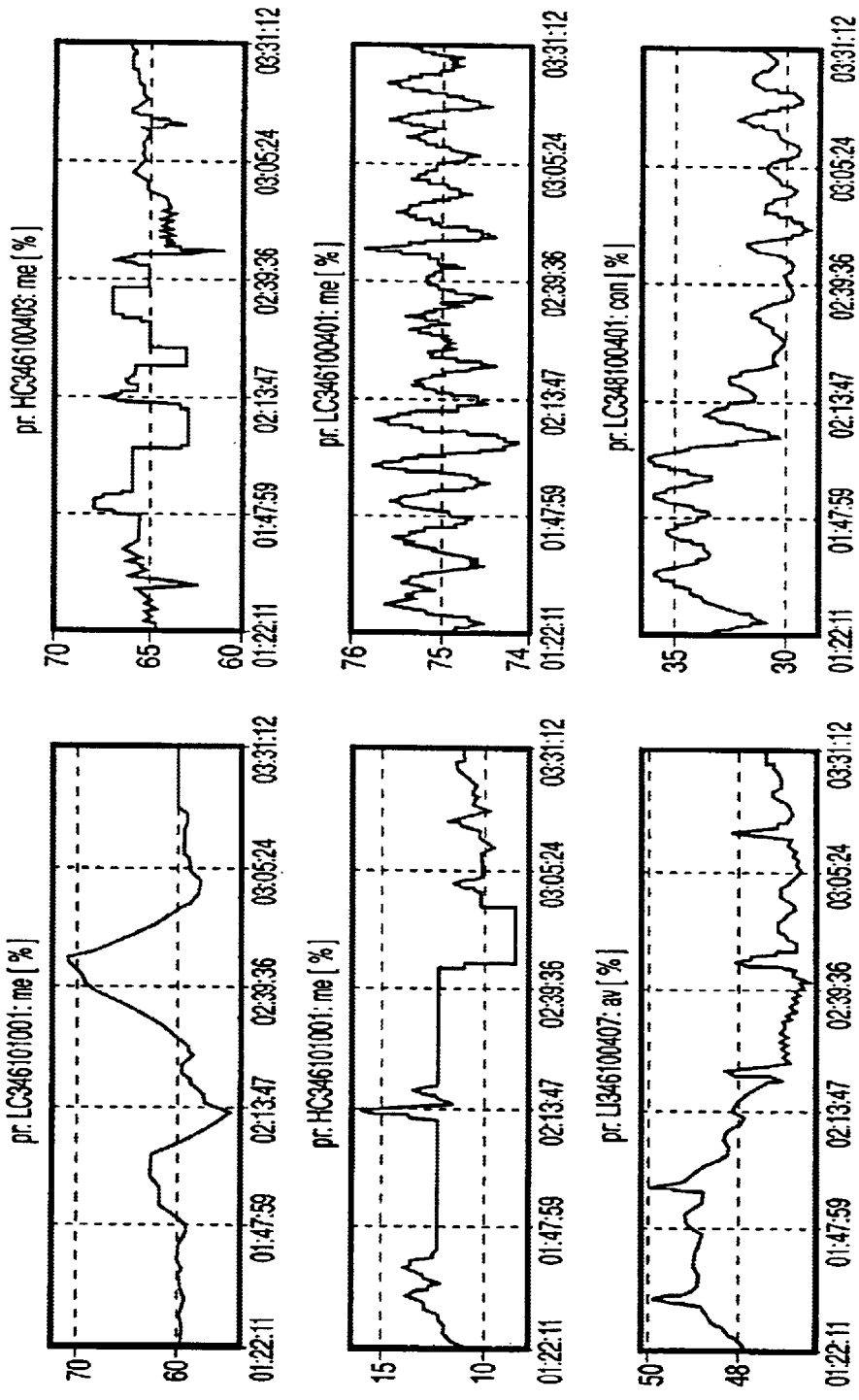
FIG. 5 is a series of graphs showing loop external disturbance variables against which the residue of FIG. 4 is correlated via the Partial Least Squares (PLS) algorithm in accordance with the present invention.
Figure 6:
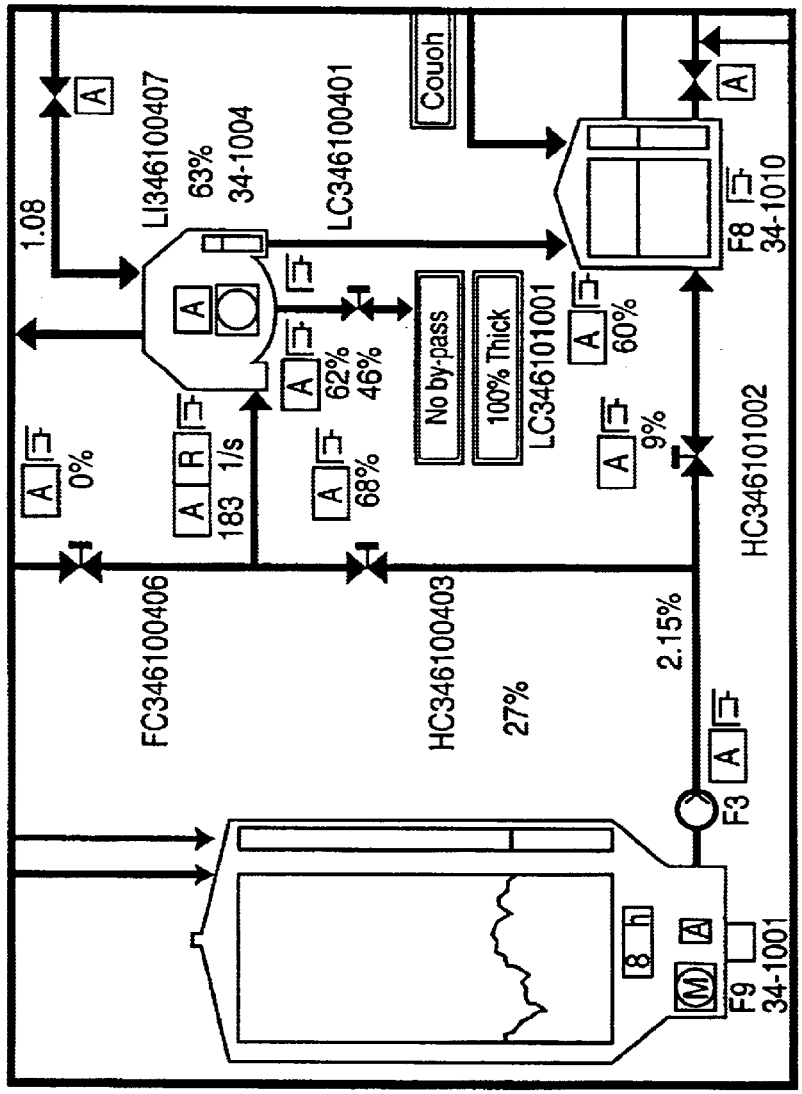
FIG. 6 is a process diagram showing the individual loop disturbances of FIG. 5.

In the particular example set forth above, the most significant influence to the loop output variance is an unknown disturbance that does not appear in FIG. 5, since according to the disturbance model, only 37% of output variation can be attributed by the known loop disturbances. If, on the other hand, the most significant influence is explainable by a latent variable, the disturbance associated with the highest weighting in the disturbance model would be the major source of variation responsible for the loop output variations. If the loop itself has a tuning deficiency or actuator malfunction, identified by a large loop performance index, standard loop diagnostic methods may be used (see T. Hagglund, "Assessment of control loop performance", *Control Systems* 94). In the present example, the original list of disturbances is extended since the latent variables generated using the initial set do not explain a major part of the loop residual v, 22.

Figure 10:
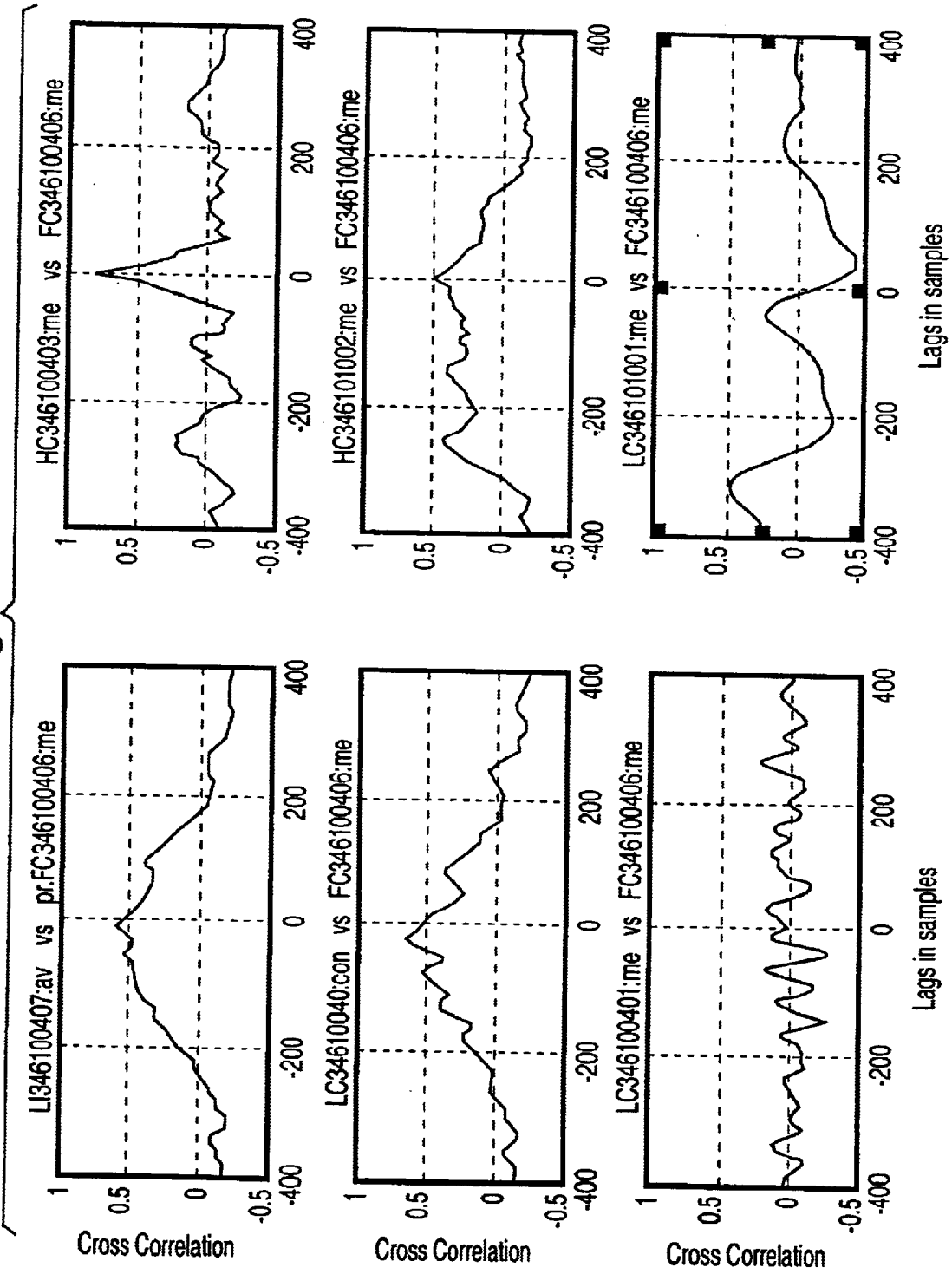
FIG. 10 is a series of graphs showing the results of prior art cross-correlation techniques for the example of FIGS. 3 to 9.

By way of comparison, a conventional cross-correlation analysis is performed for the example set forth above and the result is plotted in FIG. 10. All that may be concluded from the illustrated cross-correlation functions, is that the most correlated signal is HC346100403:me and the three signals HC346101002:me, LC346100401:con and LI346100407:av have similar degrees of correlation. There is less correlation from the other two disturbances.

In fact, as can be seen from FIG. 6, HC346100403 is a slave loop, which is closely correlated to the loop control. The high correlations from LC346100401 and HC346101002 also result due to their close relations to the control loop. It was not expected originally that a disturbance with spikes 25 minutes apart could have some significant influence on the loop. From the foregoing, it is difficult to distinguish the influence from a loop's control action and various disturbance sources using conventional correlation analysis. Likewise, conventional correlation analysis cannot provide quantitative descriptions of disturbance influences, nor reveal an unknown disturbance pattern that most significantly affects the loop.

The multi-variable control loop assessment method in accordance with the present invention reveals such unknown

TABLE 1

Standard deviation of signals in the disturbance model

| Signal components | Loop model residue v (22) | Loop model residue less first latent variable | Loop model residue less first and second latent variables | Disturbance model residue e (52) | Uncontrollable components of e (62) |
|---|---|---|---|---|---|
| Standard deviation | 3.41 | 2.55 | 2.25 | 2.16 | 1.55 |

Figure 2B:
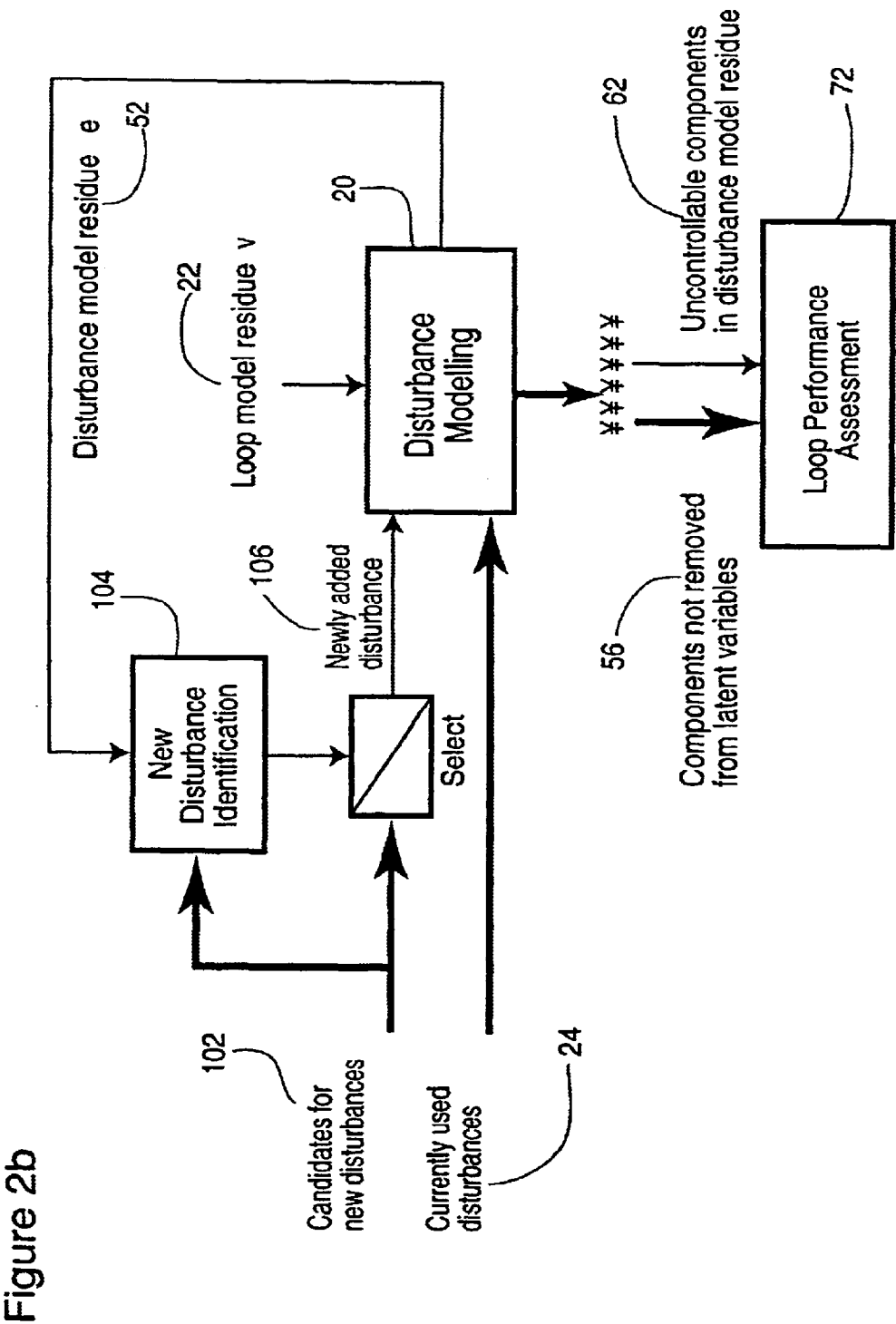
FIG. 2b is a flowchart showing the use of new disturbances to develop an improved disturbance model.
Figure 9:
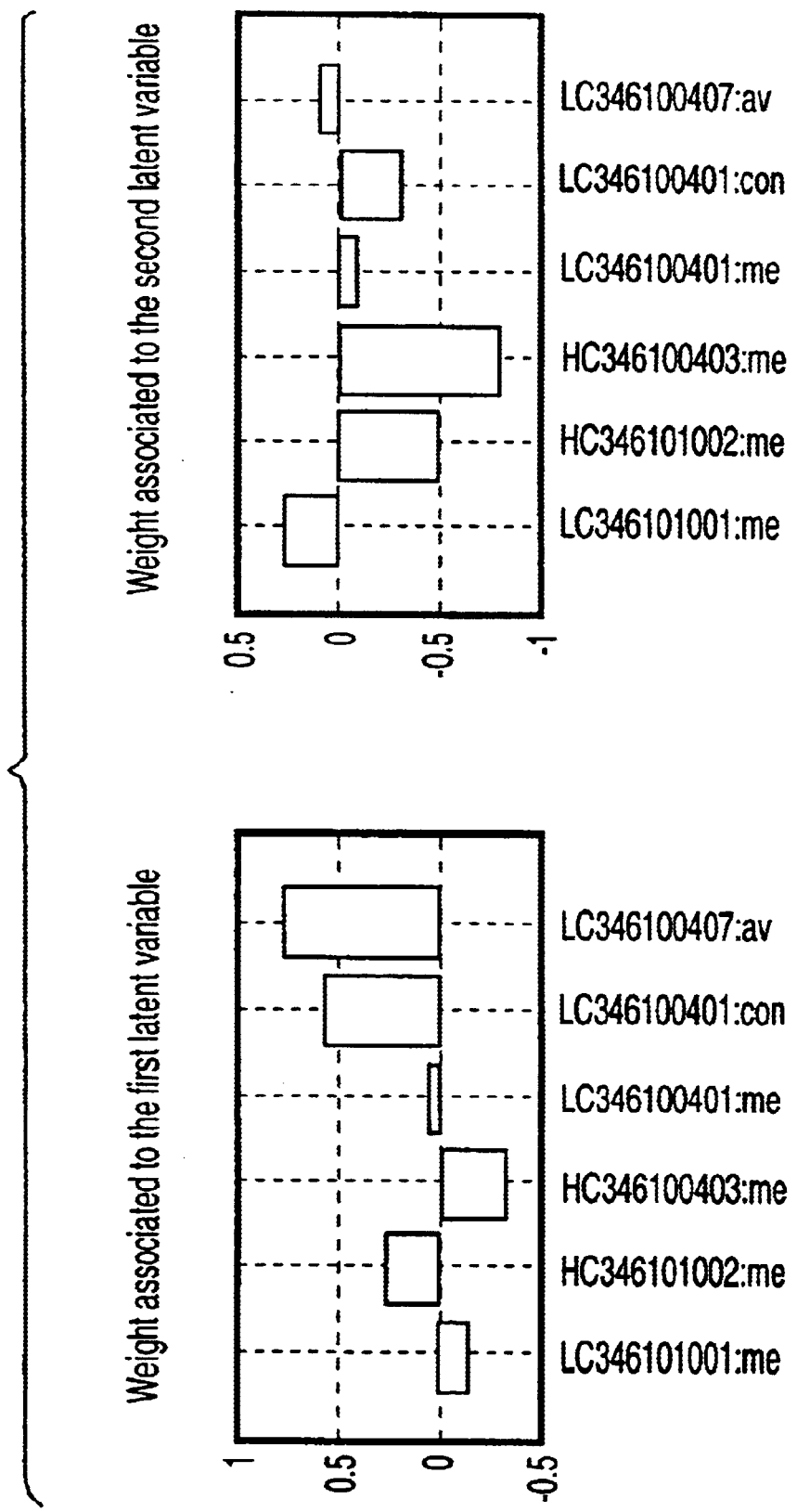
FIG. 9 is a bar graph depicting relative association of the first and second latent variables with the disturbance model inputs by weight, according to the present invention.

For the present example, according to the disturbance model, the trend LI346100407:av has the most significant weight on the first latent variable (which attributes 25.4% of output variation) and HC346100403:me has the most significant weight on the second latent variable (which attributes 8.8% of output variation), as shown in FIG. 9. Influences due to process interactions are quantified through the disturbance model 28, as set forth in detail above.

disturbance patterns that significantly affect the loop and provide quantitative descriptions of disturbance influence. Once revealed (see blocks 102 and 104 in FIG. 2*b*), disturbance model residue is used to find the most significant correlation from a list of available measurements previously ignored in the disturbance model. The revealed unknown disturbance signals that significantly affect the loop are added to the known disturbance signals (block 106) and the PLS orthogonal decomposition method is applied to the newly constructed disturbance model.

By applying the disturbance modeling method of the present invention to a broke thickening process in the stock preparation area of a paper mill, as shown in FIG. 6, the following may be ascertained:

The loop minimum achievable variance and the quantitative influence of the first three latent variables on the loop performance. The loop performance index can then be calculated as discussed in greater detail below.

Each disturbance's contribution to each latent variable. For the present example, the thickener outlet level has the biggest influence among all of the listed disturbances in the initial disturbance model as shown in FIGS. 7 to 9. A prediction of the expected loop improvement can be calculated before additional control is applied to eliminate this influence, as discussed in greater detail below.

The pattern of an unknown disturbance that attributes the biggest amount of loop variation. By finding the greatly correlated signal to the disturbance model residue, a new disturbance model can be constructed with most of the loop variation explained.

the first latent variable to the minimum performance calculation becomes $(b_1-c_1)L_1$, instead of $b_1L_1$. When the value of $c_1$ is large, the influence on the minimum performance calculation can become significant.

Based on the disturbance model 20 and time series analysis 60, the minimum achievable loop variation is calculated by adding the decomposed uncontrollable component 62 and contributing components in selected latent variables (variables selected by the user from 30, 36 and 42 and output from respective blocks 56). The loop performance index is then accordingly calculated in block 68 as a ratio of the current loop variation and the minimum achievable variation from block 66.

Figure 11:
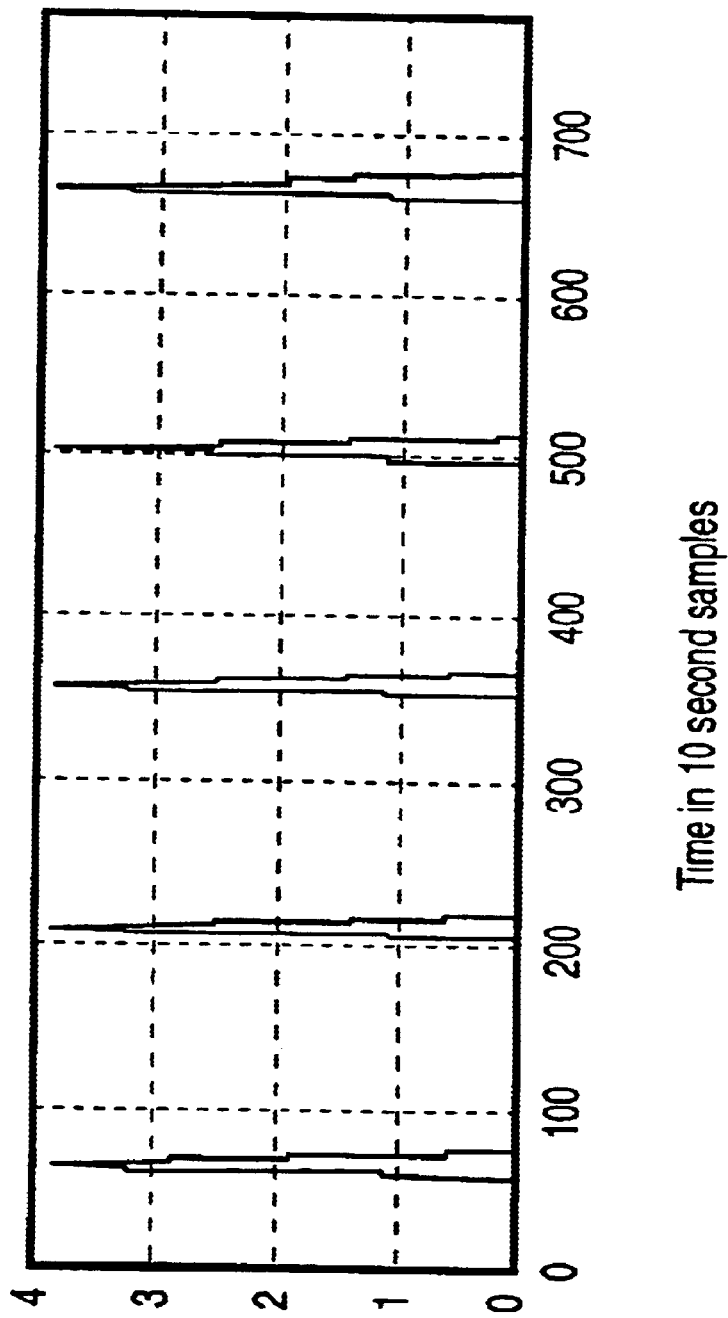
FIG. 11 is an additional disturbance representing washing water flow found to be most correlated to the disturbance model residue of FIG. 8.
Figure 12:
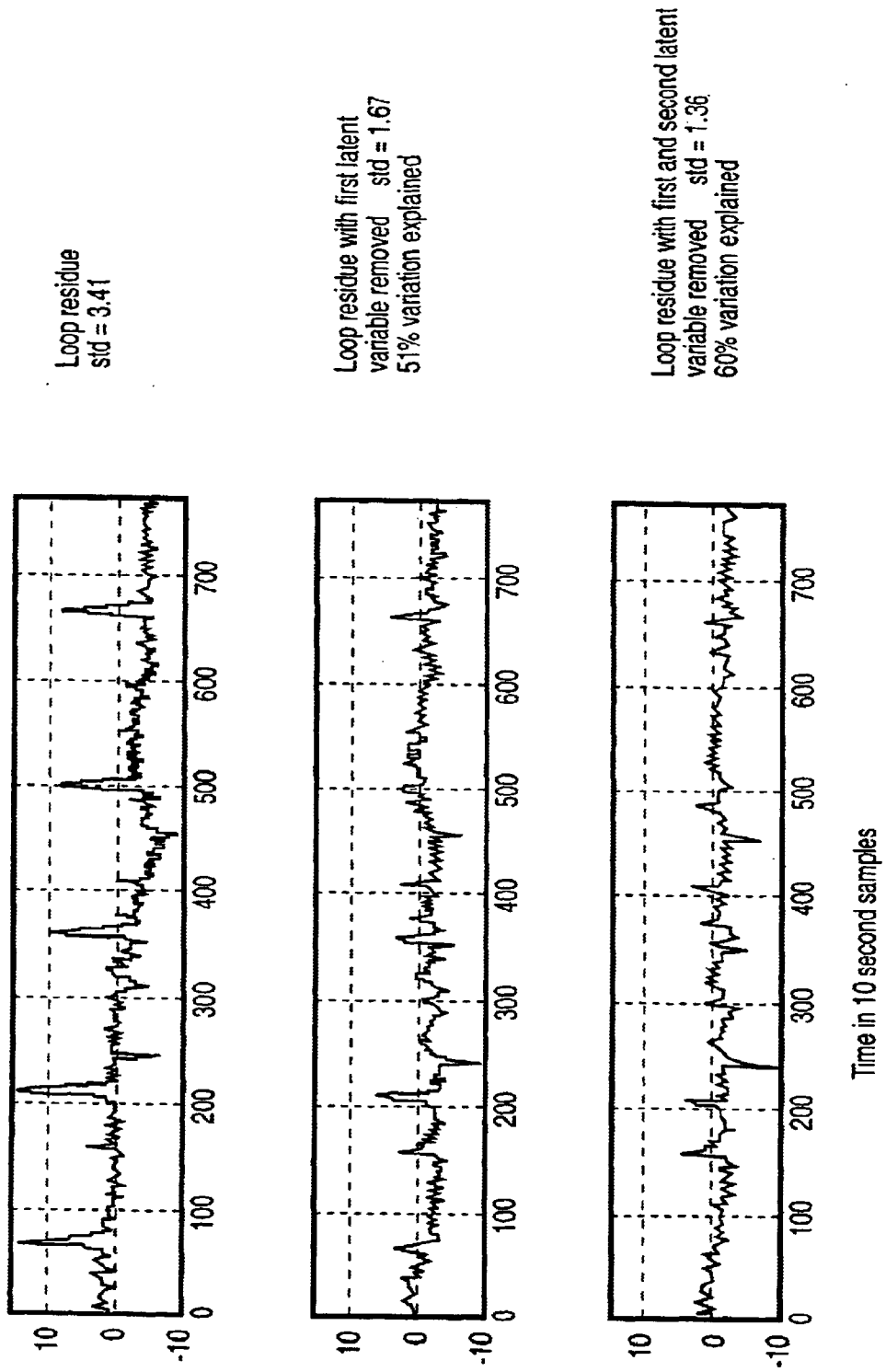
FIG. 12 is a series of graphs showing details of a new disturbance model when the washing water flow disturbance of FIG. 11 is included in the disturbance model input, using the PLS algorithm.
Figure 12:
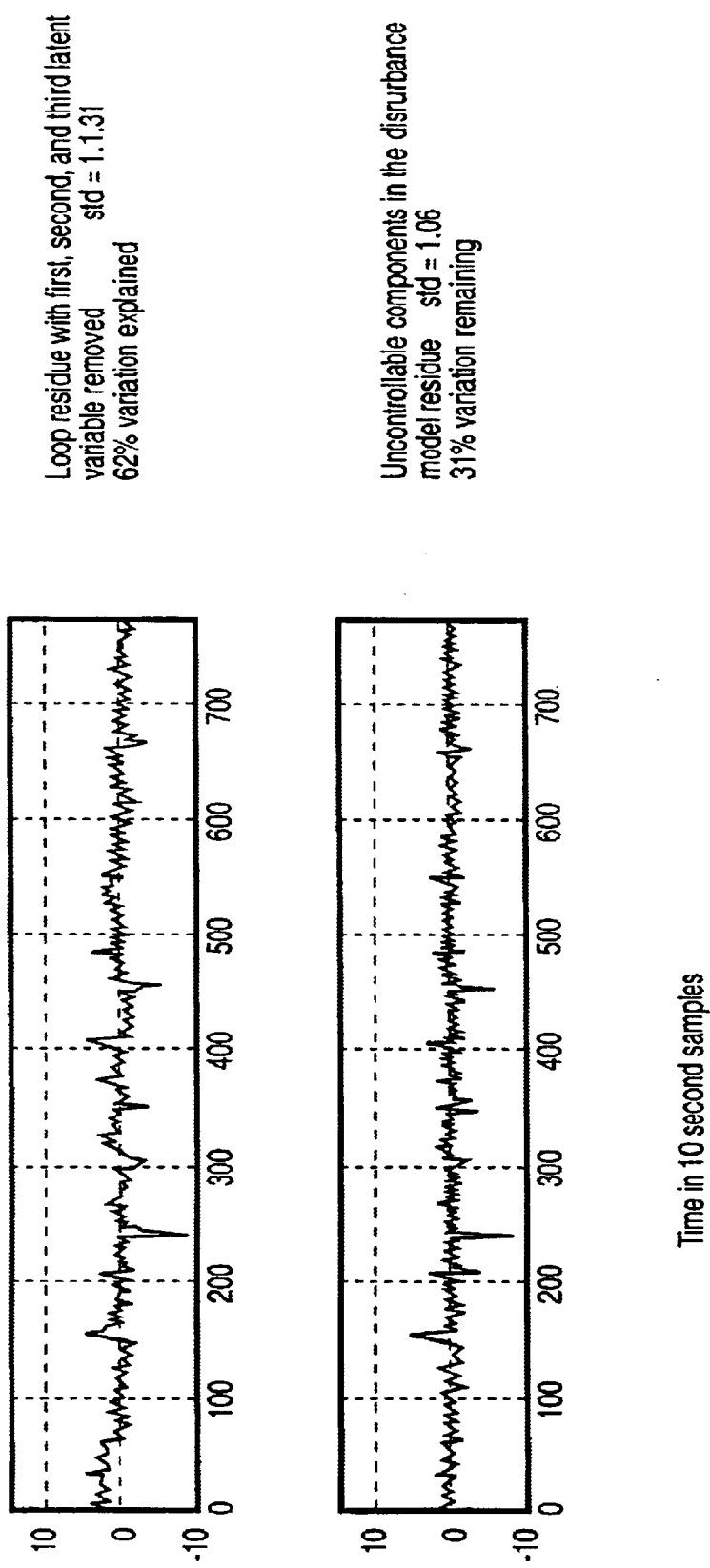

For example, FIG. 11 shows an originally unknown disturbance signal in the form of a washing flow signal that significantly affects the loop. FIG. 12 shows the new disturbance model including the washing flow signal as the loop disturbance and the new result using three latent variables. Removal of the first latent variable from the loop model residue reduces the standard deviation by 51%. With the use of second and third latent variables, 60% and 62% variation can be explained now. The standard deviation of signals in the disturbance model is shown in Table 2 below:

TABLE 2

| | Standard deviation of signals in the newly constructed disturbance model | | | | |
|---|---|---|---|---|---|
| Signal components | Loop model residue v (22) | Loop model residue less first latent variable | Loop model residue less first and second latent variables | Disturbance model residue e (52) | Uncontrollable components of e (62) |
| Standard deviation | 3.41 | 1.67 | 1.36 | 1.31 | 1.06 |

Returning to FIG. 2a, time series analysis is performed after the disturbance modeling, using an extended least square algorithm in block 60. As discussed above, the signal used for the time series analysis is calculated in block 54 using the disturbance model residue 52 and loop information. The loop delay 58 is used in block 60 to decompose the residual loop error into controllable component 64 and uncontrollable component 62.

Blocks 56 calculate the contribution of each latent variable to the minimum achievable loop variation. If the signal variation of a particular disturbance input is to be eliminated, its weighting to the latent variable is used to generate the new uncontrollable component. Naturally, the heaviest weight for the first latent variable has the most significant influence.

More particularly, the user chooses whether to include the influence of a known disturbance (x) in the minimum achievable performance calculation of block 66 (discussed in greater detail below). By default, all disturbances are included. For example, if $v=b_1L_1+b_2L_2+b_3L_3$, where v is the loop model residue, e is the disturbance model residue and $b_1L_1$, is the ith latent variable (i=1,2,3) with $b_i$ being a coefficient and $L_1$ being a vector, then $L_1, L_2, L_3$ and e are orthogonal. For a given disturbance x, the PLS orthogonal decomposition method 28 generates its attribution to each $L_1$, (i.e. $x=c_1L_1+c_2L_2+c_3L_3+\ldots$ The influence of a particular disturbance to the disturbance model output is removed using its attribution coefficients along the orthogonal space co-ordinates $L_1, L_2$ and $L_3$.

Figure 13:
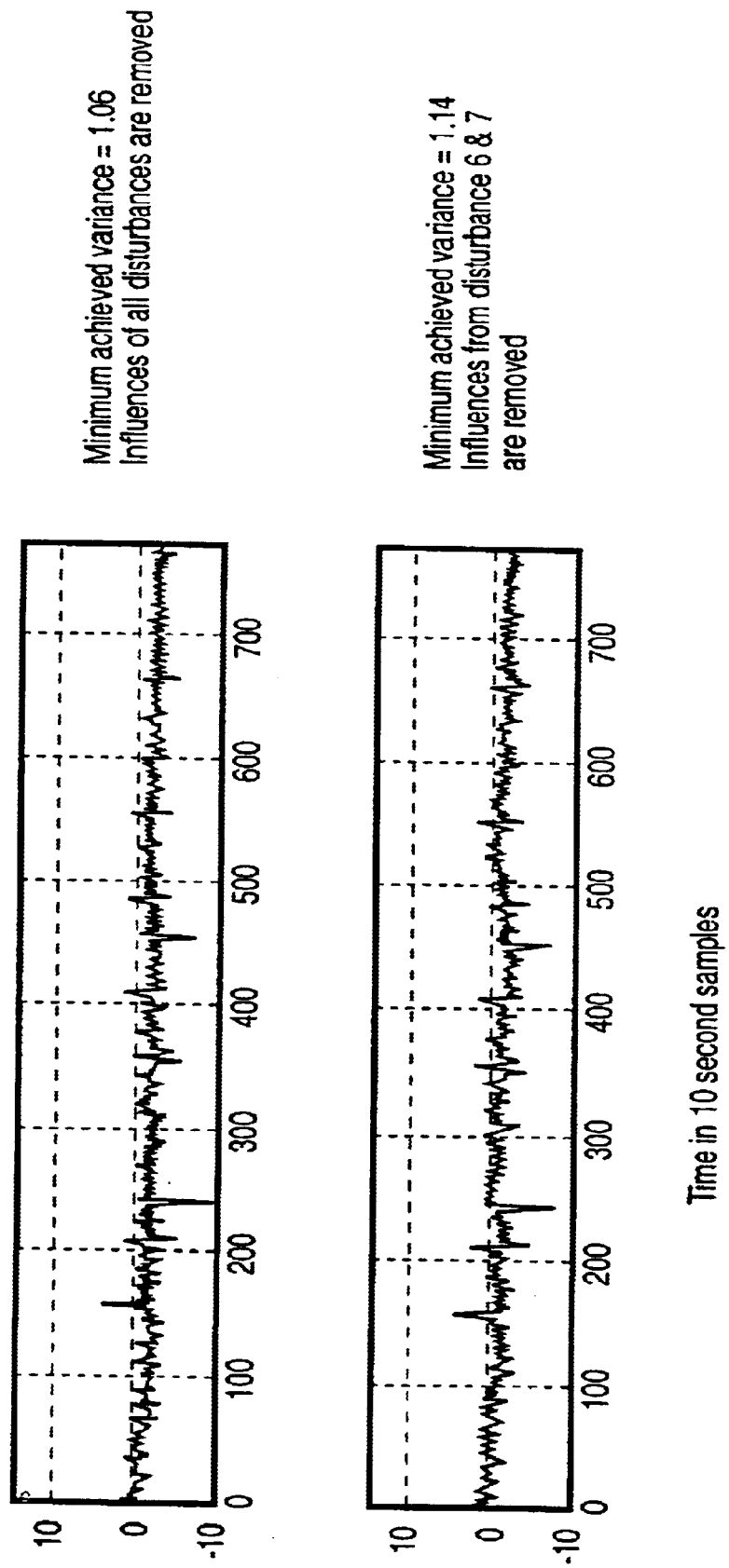
FIG. 13 shows the minimum achievable loop variation under various disturbance signal conditions, using the new disturbance model of FIG. 12.

In performance assessment 72, if it is concluded that the variation x can be eliminated (i.e. by fixing the corresponding control, or by multi-variable control), the contribution of The derived minimum achievable loop output variance is shown in FIG. 13. The minimum achievable variation with all disturbance influences removed is 1.06 (standard deviation), as shown on the top graph of FIG. 13. This is an unrealistic situation since there are a total of 7 loop disturbances.

However, when the influence of two major disturbances is removed, the minimum achievable loop output standard deviation is 1.14. The two major disturbances are the wash flow in FIG. 11 and the broke thickener outlet level LI346100407:av in FIG. 5. This is a more realistic situation since only the influence of two loop disturbances is removed and the minimum achievable loop variation is increased only slightly. This is shown on the second graph from the top in FIG. 13.

Furthermore, if only the influence of the washing flow in FIG. 11 is removed, the minimum achievable variation is increased to 1.56 (standard deviation) and this is shown on the third graph in FIG. 13.

If no disturbances are removed, the minimum achievable loop output variance is significantly higher, as shown on the bottom graph in FIG. 13.

Current state of art loop performance assessment does not incorporate disturbance modeling (block 20) as provided by the present invention, and therefore only accounts for single variable situations. The loop error is directly used in the time series analysis 60 and the uncontrollable component variation generated is considered as the minimum achievable loop output variation. Influences from various disturbances and the loop's own control actions cannot be distinguished. As discussed above, U.S. Pat. No. 5,838,561 uses an improved method to modify the loop performance index by considering the influence of other loops with similar primary or secondary frequencies. However, this generally requires that the signals be in clear oscillation (i.e. displaying clear sinusoid wave). The present method of using an orthogonal decomposition method such as a PLS algorithm to search for factors in orthogonal space provides better decomposition solutions and is suitable for more general situations. Each factor's attribution to the loop variation is quantified with the present method and as many factors may be input as may be required.

Loop diagnosis 70 is performed when the loop performance index 68 is large (i.e. loop variation is much larger than the minimum achievable value, typically a ratio over 2 or 3). With the disturbance's influence being accounted for, the large loop variation due to a loop's own deficiency can be diagnosed using prior art methods, for further classification if control tuning or control valve malfunction is the cause, etc.

Another benefit of the inventive method is in the prediction of potential control improvement when an advanced control solution is to be added. For example, multivariable or feed-forward control has the potential to eliminate the influence of a measurable disturbance to the loop. With the disturbance influence quantified, potential loop improvement can be predicted.

Studying the pattern of the disturbance model residue (e), 52, and correlating it to other signals not used in the disturbance model will help the user to gain further process knowledge, as demonstrated also herein.

A person of ordinary skill in the art will understand that modifications and alternatives are possible within the sphere and scope of the invention as set forth in the claims appended hereto.

What is claimed is:

1. A method of assessing a process having at least one measured loop input, one measured loop output and a plurality of known and unknown disturbances, comprising:

generating a predicted model of said process using parameter estimation, including predicting model loop delay;

calculating a loop model residue between said loop measured output and said predicted model output;

applying an orthogonal decomposition method to find orthogonal latent variables that correlate with said loop model residue and which account for successively decreasing variations in said loop model residue, and associating respective weightings between said plurality of known disturbances and each of said latent variables;

calculating a disturbance model residue which is orthogonal to said latent variables and represents primarily loop variation from said unknown disturbances by subtracting said successive orthogonal latent variables from said loop model residue;

performing time series analysis on said disturbance model residual error using said model loop delay to decompose said disturbance model residue into a controllable component and an uncontrollable component;

calculating a minimum achievable loop variation based on selective removal of respective ones of said latent variables by calculating the sum of uncontrollable components of the disturbance model residue and the remaining latent variables;

calculating a loop performance index as a ratio of standard deviation in said measured loop output to said calculated minimum achievable loop variation; and performing loop diagnostics in the event said loop performance index exceeds a predetermined amount.

2. The method of claim 1, wherein said applying of the orthogonal decomposition method to identify successive orthogonal latent variables further comprises i) extracting the most dominant correlation and then using the residue therefrom to extract secondary dominant correlation in an orthogonal space, and ii) repeating i) until no further output variation can be significantly attributed by the next dominant correlation.

3. The method of claim 1, wherein generating said predicted model of said process further comprises dynamic processing loop modeling to estimate said model loop delay as well as loop gain and time constant.

4. The method of claim 3, wherein said loop modeling further includes initiating bump tests to generate a first order dynamic model of said loop delay, loop gain and time constant via parameter estimation.

5. The method of claim 1, wherein said disturbances are subjected to at least one of delay and moving average by amounts determined using cross-correlation between each disturbance signal and said loop model residue.

6. The method of claim 1, wherein said time series analysis is performed via an extended least square algorithm.

7. The method of claim 1 wherein such orthogonal decomposition method is a Partial Least Squares Method.

8. A method of identifying at least one new disturbance variable in a process loop represented by a disturbance model using cross-correlation of the loop or disturbance model residue and signals not used by the disturbance model to improve the disturbance model and the minimum achievable variation by eliminating the influence of the said at least one disturbance variable comprising:

applying an orthogonal decomposition method to find orthogonal latent variables that correlate with said loop model residue and which account for successively decreasing variations in said loop model residue, and associating respective weightings between said plurality of known disturbances and each of said latent variables;

calculating a disturbance model residue which is orthogonal to said latent variables and represents primarily loop variation from said unknown disturbances by subtracting said successive orthogonal latent variables from said loop model residue;

performing time series analysis on said disturbance model residual error using said model loop delay to decompose said disturbance model residue into a controllable component and an uncontrollable component;

calculating a minimum achievable loop variation based on selective removal of respective ones of said latent variables by calculating the sum of uncontrollable components of the disturbance model residue and the remaining latent variables;

calculating a loop performance index as a ratio of standard deviation in said measured loop output to said calculated minimum achievable loop variation; and performing loop diagnostics in the event said loop performance index exceeds a predetermined amount.

9. The method of claim 8 wherein said orthogonal decomposition method is a Partial Least Squares Method.

10. Apparatus for assessing a process having at least one measured loop input, one measured loop output and a plurality of known and unknown disturbances, comprising:

a loop modeling block for generating a predicted model of said process using parameter estimation, including predicting model loop delay;

a model residue block for calculating a loop model residue between said loop measured output and said predicted model output;

a disturbance modeling block for applying an orthogonal decomposition method to find orthogonal latent variables that correlate with said loop model residue and which account for successively decreasing variations in said loop model residue, and associating respective weightings between said plurality of known disturbances and each of said latent variables;

a model residue block for calculating a disturbance model residue which is orthogonal to said latent variables and represents primarily loop variation from said unknown disturbances by subtracting said successive orthogonal latent variables from said loop model residue;

a time series analysis block for performing time series analysis on said disturbance model residual error using said model loop delay to decompose said disturbance model residue into a controllable component and an uncontrollable component;

a block for calculating a minimum achievable loop variation based on selective removal of respective ones of said latent variables by calculating the sum of uncontrollable components of the disturbance model residue and the remaining latent variables; and a further block for calculating a loop performance index as a ratio of standard deviation in said measured loop output to said calculated minimum achievable loop variation and in the event said loop performance index exceeds a predetermined amount then performing loop diagnostics.

11. Apparatus according to claim 10 wherein said disturbance modeling block applies a Partial Least Squares orthogonal decomposition method.

12. Apparatus for identifying at least one new disturbance variable in a process loop represented by a disturbance model using cross-correlation of the loop or disturbance model residue and signals not used by the disturbance model to improve the disturbance model and the minimum achievable variation by eliminating the influence of the said at least one disturbance variable comprising:

a disturbance modeling block for applying an orthogonal decomposition method to find orthogonal latent variables that correlate with said loop model residue and which account for successively decreasing variations in said loop model residue, and associating respective weightings between said plurality of known disturbances and each of said latent variables;

a model residue block for calculating a disturbance model residue which is orthogonal to said latent variables and represents primarily loop variation from said unknown disturbances by subtracting said successive orthogonal latent variables from said loop model residue;

a time series analysis block for performing a time series analysis on said disturbance model residual error using said model loop delay to decompose said disturbance model residue into a controllable component and an uncontrollable component;

a block for calculating a minimum achievable loop variation based on selective removal of respective ones of said latent variables by calculating the sum of uncontrollable components of the disturbance model residue and the remaining latent variables; and a further block for calculating a loop performance index as a ratio of standard deviation in said measured loop output to said calculated minimum achievable loop variation and in the event said loop performance index exceeds a predetermined amount then performing loop diagnostics.

13. Apparatus according to claim 12 wherein said disturbance modeling block applies a Partial Least Squares orthogonal decomposition method.

* * * * *